US012668683B2

(12) United States Patent
Li et al.

(10) Patent No.: US 12,668,683 B2
(45) Date of Patent: Jun. 30, 2026

(54) HIGH-HEAT AND HIGH-SHEAR-RESISTANT HIGH-FLAME-RETARDANT HALOGEN-FREE FLAME-RETARDANT COMPOUND SYSTEM AND USE

(71) Applicants: JIANGSU LISIDE NEW MATERIAL CO., LTD., Taizhou (CN); ZHEJIANG UNIVERSITY, Hangzhou (CN)

(72) Inventors: Jinzhong Li, Taizhou (CN); Hua Lei, Taizhou (CN)

(73) Assignees: JIANGSU LISIDE NEW MATERIAL CO., LTD., Taizhou (CN); ZHEJIANG UNIVERSITY, Hangzhou (CN)

( * ) Notice: Subject to any disclaimer, the term of this patent is extended or adjusted under 35 U.S.C. 154(b) by 570 days.

(21) Appl. No.: 18/031,581

(22) PCT Filed: Oct. 11, 2021

(86) PCT No.: PCT/CN2021/122972
§ 371 (c)(1),
(2) Date: Apr. 12, 2023

(87) PCT Pub. No.: WO2022/078274
PCT Pub. Date: Apr. 21, 2022

(65) Prior Publication Data
US 2023/0416503 A1 Dec. 28, 2023

(30) Foreign Application Priority Data
Oct. 12, 2020 (CN) ......................... 202011084963.6

(51) Int. Cl.
*C08K 13/02* (2006.01)
*C08J 5/04* (2006.01)
*C08J 5/10* (2006.01)
*C09K 21/04* (2006.01)
*C09K 21/12* (2006.01)
*C08K 3/32* (2006.01)
*C08K 5/098* (2006.01)
*C08K 5/5313* (2006.01)

(52) U.S. Cl.
CPC ............... *C08K 13/02* (2013.01); *C08J 5/043* (2013.01); *C08J 5/10* (2013.01); *C09K 21/04* (2013.01); *C09K 21/12* (2013.01); *C08J 2377/06* (2013.01); *C08K 2003/327* (2013.01); *C08K 5/098* (2013.01); *C08K 5/5313* (2013.01); *C08K 2201/014* (2013.01)

(58) Field of Classification Search
CPC .. C08K 13/02; C08J 5/043; C08J 5/10; C09K 21/04; C09K 21/12
See application file for complete search history.

(56) References Cited

U.S. PATENT DOCUMENTS

| | | | |
|---|---|---|---|
| 2016/0032076 | A1 | 2/2016 | Stockdale et al. |
| 2019/0153322 | A1 | 5/2019 | Bauer et al. |

FOREIGN PATENT DOCUMENTS

| | | | | |
|---|---|---|---|---|
| CN | 106573776 | | 4/2017 | |
| CN | 107637605 | | 1/2018 | |
| CN | 107641218 | | 1/2018 | |
| CN | 111234313 | | 6/2020 | |
| DE | 102007015083 | | 10/2008 | |
| JP | 2010024272 A | * | 2/2010 | .............. C08L 67/02 |

OTHER PUBLICATIONS

English machine translation of JP 2010-024272A. (Year: 2010).*

* cited by examiner

*Primary Examiner* — John E Uselding
(74) *Attorney, Agent, or Firm* — Jiwen Chen; Joywin IP Law PLLC

(57) ABSTRACT

The present invention discloses a high-heat and high-shear-resistant high-flame-retardant halogen-free flame-retardant compound system and use thereof in a glass fiber reinforced material. The flame-retardant compound system comprises the following components in weight percentages: 40%-99.9% of aluminum diethylphosphinate, 0.1%-50% of a poly/mono-phosphorous acid-condensed diphosphite salt and/or a condensed diphosphite salt, 0-40% of inorganic aluminum phosphite, and 0-10% of a zinc-containing thermally stable compound, wherein the poly/mono-phosphorous acid-condensed diphosphite salt and the condensed diphosphite salt has a structural formula shown in a formula (I):

(I)

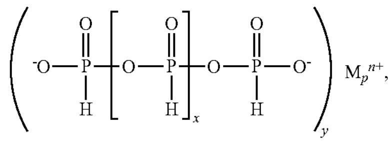

wherein, x is an integer of 0-6, n, y, and p are integers of 1-4, and M is Ca, Mg, Al, Zn, Fe, Sn or Ti.

13 Claims, No Drawings

HIGH-HEAT AND HIGH-SHEAR-RESISTANT HIGH-FLAME-RETARDANT HALOGEN-FREE FLAME-RETARDANT COMPOUND SYSTEM AND USE

This is a U.S. national stage application of PCT Application No. PCT/CN2021/122972 under 35 U.S.C. 371, filed Oct. 11, 2021 in Chinese, claiming priority of Chinese Application No. 202011084963.6, filed Oct. 12, 2020, all of which are hereby incorporated by reference.

FIELD OF TECHNOLOGY

The present invention relates to the technical field of flame retardant materials and particularly relates to a high-heat and high-shear-resistant high-flame-retardant halogen-free flame-retardant compound system and use thereof.

BACKGROUND TECHNOLOGY

Glass fiber reinforced engineering plastics (such as various nylons, polyesters and the like) are widely used in the fields of electronic and electric appliances due to performance characteristics of good rigidity and impact resistance, low warping property, high dimensional stability, good surface appearance and the like. In the use of the fields, a flame retardant requirement is provided for a material. However, most engineering plastics are flammable materials. After the engineering plastics are compounded with glass fibers, the glass fiber reinforced engineering plastics are easier to burn due to a wick effect of the glass fibers. Therefore, when the glass fiber reinforced engineering plastics are used in the fields, a flame retardant problem needs to be solved. Besides, flame retardance is more difficult due to the wick effect.

At present, the flame retardance of the glass fiber reinforced engineering plastics comprises two basic flame-retardant systems: a halogen-based flame-retardant system and a halogen-free flame-retardant system. The halogen-based flame-retardant system is generally a brominated flame retardant with antimony trioxide. A large amount of researches show that the glass fiber reinforced engineering plastics containing the brominated flame retardant can generate harmful substances such as dense smoke, hydrogen bromide and the like during combustion and can cause asphyxiation of human body. Therefore, developing a safe, environment-friendly, and halogen-free flame-retardant system for the glass fiber reinforced engineering plastics becomes a research hotspot. A novel halogen-free flame retardant or flame retardant system used in the glass fiber reinforced engineering plastics has appeared in recent years.

According to literature reports, the halogen-free flame retardant used in the glass fiber reinforced engineering plastics mainly comprises two main basic systems: one is red phosphorus; and the other is a phosphorus-nitrogen based flame-retardant system. Although the red phosphorus has a good flame-retardant effect, there are two problems: firstly, a color of the red phosphorus limits a use range of the red phosphorus which is generally only used in a black product; and secondly, in a processing process, severe poisons such as phosphine and the like are easily generated to bring problems of environmental protection and safety. Therefore, the red phosphorus is not a best choice for the glass fiber reinforced engineering plastics. The phosphorus-nitrogen based flame-retardant system is a highly efficient flame-retardant system, has a high flame-retardant efficiency, also avoids some defects of the red phosphorus, and is a hotspot of a current research. At present, a phosphorus-nitrogen compound system based on aluminum diethylphosphinate, for example, an aluminum diethylphosphinate compound melamine polyphosphate (MPP) system, is mostly used. Since the system has a relatively high phosphorus content and a synergistic effect of phosphorus and nitrogen, the system realizes a highly efficient flame retardance of the glass fiber reinforced engineering plastics, does not have a product color problem, at the same time has a very high decomposition temperature, and does not generate extremely toxic gases such as phosphine in a high-temperature processing process of the glass fiber reinforced engineering plastics. However, the phosphorus-nitrogen compound system based on aluminum diethylphosphinate still has some defects, mainly shown in that: firstly, two components react and decompose at a high temperature to generate a small amount of acid gas, the acid gas can corrode metal parts of a processing device, and the parts need to be replaced after a certain time, such that a cost is increased and production efficiency is reduced; and secondly, a nitrogen-containing compound MPP is separated out to a certain extent. During an injection molding process of a material, after a product with a certain modulus is injected, a deposit can exist on a mold, such that an appearance of the product can be influenced by the deposit, the mold needs to be stopped and cleaned, and the production efficiency can also be reduced. At the same time, the separation can cause a flame retardant to migrate to a surface of the product, such that the flame retardant is unevenly distributed and lost, the flame retardance of the material is finally disabled, and potential safety hazards exist.

With regard to a use problem of the phosphorus-nitrogen system, a nitrogen-free compound system of aluminum diethylphosphinate and aluminum phosphite is also developed. The system has no problems of high flame retardance, high temperature resistance, no color trouble of white color, and the like. The compound system is also widely used at present. However, there are still several problems in the system: (1) the system has a weak shear resistance and is easy to change color due to an enhanced shear force under a high content of glass fibers, which limits a use range of a flame retardant; (2) the aluminum phosphite has a certain solubility, such that the flame retardant is easy to absorb moisture, and when the flame retardant is used in polymers, a product also has a risk of absorbing moisture, and an electrical insulation performance is affected; (3) the aluminum phosphite has a stronger acidity and still has certain negative effects on the polymers and processing devices; and (4) a phosphorous content of the aluminum phosphite is still slightly low, flame retardance is unstable for some thin products, a thinner product is more difficult to retard flame, and thus a flame retardant needs a higher flame retardance. In order to solve the use problems of the compound system of a diethylphosphinate salt and the aluminum phosphite, it is necessary to develop a novel halogen-free flame-retardant system.

Aiming at defects of an existing compound flame-retardant system based on aluminum diethylphosphinate used in glass fiber reinforced engineering plastics, the present invention develops a novel halogen-free flame-retardant system used in the glass fiber reinforced engineering plastics. Besides, on the basis, the halogen-free flame-retardant glass fiber reinforced engineering plastics can be prepared.

SUMMARY OF THE INVENTION

Aiming at the defects in the art, the present invention provides a high-heat and high-shear-resistant high-flameretardant halogen-free flame-retardant compound system and overcomes the defects of the existing flame-retardant system. The newly invented flame-retardant system has characteristics of higher flame retardance, high heat and high shear resistance, low moisture absorption, low acidity, and the like. The flame-retardant system of the present invention can be used in glass fiber reinforced engineering plastics to obtain a halogen-free flame-retardant glass fiber reinforced engineering plastic material and can be used for preparing components or products in the field of electronic and electric appliances.

In the present invention, aluminum diethylphosphinate is used in the present invention to be cooperated with a poly/mono-phosphorous acid-condensed diphosphite salt and other selectively added synergistic compounds to form a high-heat and high-shear-resistant synergistic compound flame-retardant system, which solves defects of shear intolerance, easy moisture absorption, relatively high acidity and the like of the existing flame-retardant system. The novel flame-retardant system can be well adapted to the glass fiber reinforced engineering plastics to obtain a halogen-free flame-retardant material with an excellent performance.

A high-heat and high-shear-resistant high-flame-retardant halogen-free flame-retardant compound system comprises the following components in weight percentages:

40%-99.9% of aluminum diethylphosphinate, 0.1%-50% of a poly/mono-phosphorous acid-condensed diphosphite salt and/or a condensed diphosphite salt, 0-40% of inorganic aluminum phosphite, and 0-10% of a zinc-containing thermally stable compound, wherein the poly/mono-phosphorous acid-condensed diphosphite salt and the condensed diphosphite salt has a structural formula shown in a formula (I):

(I)

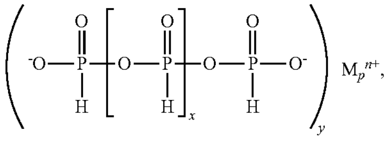

wherein, x is an integer of 0-6, n, y, and p are integers of 1-4, and M is Ca, Mg, Al, Zn, Fe, Sn or Ti. When x is 0, the formula is the condensed diphosphite salt, and when x is an integer of 1-6, the formula is the poly/mono-phosphorous acid-condensed diphosphite salt.

The compound flame-retardant system is particularly suitable for high-glass-fiber-content reinforced engineering plastics such as various nylon, polyester, polyketone (POK) and the like, as well as a thin-walled product, and can reach a flame-retardant standard of UL94 V-0 with a thickness of 0.4 mm.

The present invention aims to solve various defects of the existing halogen-free flame-retardant system used in the glass fiber reinforced engineering plastics. The inventor performs an extensive and intensive research. Aiming at the problems of the existing compound flame-retardant system based on the aluminum diethylphosphinate in the flame-retardant glass fiber reinforced engineering plastics, a new flame-retardant system is investigated. A result shows that the aluminum diethylphosphinate is cooperated with the poly/mono-phosphorous acid-condensed diphosphite salt and/or the condensed diphosphite salt, and other selectively added synergistic compounds to well solve the problem. A chemical structure of aluminum diethylphosphinate is shown in the following formula:

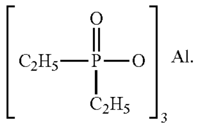

The aluminum diethylphosphinate has a high phosphorus content, a good flame retardance, a higher initial decomposition temperature, a low water solubility, a migration resistance, and no moisture absorption, and is more used in engineering plastics such as nylon, PBT and the like at present, particularly in the glass fiber reinforced engineering plastics. The aluminum diethylphosphinate used alone does not have a problem of separation out, but has an insufficient flame-retardant performance, such that it further needs to be cooperated with a synergist to meet a flame-retardant requirement. At present, a flame-retardant system used in the glass fiber reinforced engineering plastics comprises two systems: (1) aluminum diethylphosphinate in cooperation with an MPP system; and (2) aluminum diethylphosphinate in cooperation with an aluminum phosphite system.

When compounded with the MPP for use, the aluminum diethylphosphinate has a reduced decomposition temperature, can release acid gases and ammonia in a processing process, and will corrode metal parts of a processing device. Besides, a migration characteristic of the MPP enables a deposit to be remained on a mold surface, and thus an appearance is affected, the mold needs to be regularly cleaned, and production efficiency is reduced. It is obvious that the MPP is critical to these problems, and thus use of the MPP is minimized or eliminated as much as possible.

When the aluminum diethylphosphinate is cooperated with the aluminum phosphite for use, due to moisture absorption, high temperature and shear intolerance, and slightly low phosphorus content of the aluminum phosphite, there are still several problems in the system: (1) a system has a weak shear resistance and is easy to change color under a high content of glass fibers, which limits a use range of a flame retardant; (2) the aluminum phosphite has a certain solubility, such that a flame retardant is easy to absorb moisture, and when the flame retardant is used in polymers, a product also has a risk of absorbing moisture, and an electrical insulation performance is affected; (3) the aluminum phosphite has a stronger acidity and still has certain negative effects on the polymers and processing devices; and (4) a phosphorous content of the aluminum phosphite is still slightly low, and flame retardance is unstable for some thin-walled products.

The inventors found out through research that in the presence of the aluminum diethylphosphinate, a novel synergist of a poly/mono-phosphorous acid-condensed diphosphite salt and/or a condensed diphosphite salt is selected to form a flame-retardant system mainly based on an organic phosphorus aluminum structure. The system has a better flame-retardant characteristic.

In a preferred example, a preparation method for the condensed diphosphite salt comprises the following steps: crushing a hydrogen phosphite solid of a metal M (M is Ca, Mg, Al, Zn, Fe, Sn or Ti) to an average particle size D50 of about 10 μm, uniformly mixing the crushed solid with 1 wt %-2 wt % (calculated by a mass of the hydrogen phosphite solid of the metal M as 100%) of concentrated phosphoric acid ($H_3PO_4$) with a concentration more than or equal to 85 wt %, placing the mixture in an oven, and heating the mixture in a slow and constant speed or a stepped manner to raise a temperature of the material from a normal temperature to 290° C. in about 5 hours, wherein a heating speed is less than or equal to 5° C./min in the whole heating process. The solid obtained by the reaction is the condensed diphosphite salt. An average particle size of the solid is controlled to be 5-10 μm by crushing.

A preparation method for the poly/mono-phosphorous acid-condensed diphosphite salt comprises the following steps:

(1) dissolving phosphorous acid and a hydrogen phosphite of a metal M as reactants in water, adding 1%-5% of a mass of the reactants of concentrated phosphoric acid ($H_3PO_4$) with a concentration more than or equal to 85 wt %, uniformly stirring and mixing same, and performing a reaction at 80-90° C., wherein M is Ca, Mg, Al, Zn, Fe, Sn or Ti;

(2) drying the material obtained by the reaction in step (1) until a water content is 0.3 wt % or below, wherein a temperature of the drying is controlled to be 150° C. or below;

(3) performing a dehydration reaction on the product obtained by the drying in step (2) at a temperature of 200-300° C. under an inert atmosphere or vacuum condition, finishing the dehydration reaction when a temperature corresponding to a thermal weight loss of the product of 2 wt % is greater than 400° C., and performing cooling to room temperature and discharging to obtain a solid; and (4) water-washing the solid obtained in step (3) until a conductivity of a washing effluent is less than 50 μs/cm and drying the water-washed product until a water content is less than 0.3 wt %, so as to obtain the poly/mono-phosphorous acid-condensed diphosphite salt compound.

When the poly/mono-phosphorous acid-condensed diphosphite salt compound is compounded with the aluminum diethylphosphinate, the poly/mono-phosphorous acid-condensed diphosphite salt compound can be crushed to a required particle size in advance.

Compared with the aluminum phosphite, the poly/mono-phosphorous acid-condensed diphosphite salt compound has a higher phosphorus content, high temperature and shear resistance, lower moisture absorption, and weaker acidity, can act synergistically with the aluminum diethylphosphinate, and is particularly suitable for reinforcement of high glass fibers, and a thin-walled product.

Further research found that the aluminum phosphite can still be added into the compound system of the aluminum diethylphosphinate and the poly/mono-phosphorous acid-condensed diphosphite salt. The system still has a higher flame retardance and a performance of the system cannot be deteriorated.

In addition, it is further found that a small amount of a zinc-containing thermally stable compound which is resistant to a high temperature and does not separate out can be introduced into the compound system of the aluminum diethylphosphinate and the poly/mono-phosphorous acid-condensed diphosphite salt to further improve corrosion resistance and flame retardance without causing a problem of separation out. The zinc-containing thermally stable compound comprises zinc borate, zinc stannate and the like. The zinc-containing thermally stable compound without a crystal water has a very high decomposition temperature and a low water solubility, does not migrate and separate out, can be cooperated with an organic phosphorus aluminum structure to improve flame retardance, and has an effect of inhibiting smoke to reduce a smoke density.

Preferably, the aluminum diethylphosphinate has an average particle size D50 satisfying 10 μm<1D50<50 μm.

Preferably, the poly/mono-phosphorous acid-condensed diphosphite salt has an average particle size D50 satisfying 10 m<1D50<50 μm.

Preferably, the inorganic aluminum phosphite has an average particle size D50 satisfying 10 μm<1D50<50 μm.

Preferably, the zinc-containing thermally stable compound comprises at least one of zinc borate, zinc oxide, and zinc stannate, and has an average particle size D50 satisfying 10 μm<1D50<50 μm.

The present invention further provides use of the high-flame-retardant halogen-free flame-retardant compound system in a glass fiber reinforced material, wherein the glass fiber reinforced material is a glass fiber reinforced nylon, a glass fiber reinforced polyester or a glass fiber reinforced POK.

The high-flame-retardant halogen-free flame-retardant compound system is a functional additive for endowing a flame-retardant performance to glass fiber reinforced engineering plastics and accounts for 5-40 wt % of the whole glass fiber reinforced material system to meet related standard requirements.

In order to prepare a halogen-free flame-retardant glass fiber reinforced material, the flame-retardant system is further needed to be uniformly dispersed in the material. A plurality of components are melted and mixed in a twin-screw extruder with a glass fiber feeding port and a flame retardant powder feeding port, extruded, and granulated.

The flame retardant system of the present invention is suitable for glass fiber reinforced engineering plastics. Glass fibers play a role in improving mechanical performances of a material such as rigidity and the like in the system, but the glass fibers are a rigid component, can generate a strong friction with a flame retardant in a processing process, and apply a strong shear force to the flame retardant. The shear force can cause decomposition of the flame retardant, cause a color change and acidity of the material, and even cause foaming, release of harmful gases and the like. When the content of the glass fibers is higher, the shear force borne by the system in a processing process is larger and a requirement on shear resistance of the flame retardant is also higher. Research showed that the system of the present invention is particularly suitable for the glass fiber reinforced engineering plastics under the high content of the glass fibers (a mass ratio of the glass fibers in the glass fiber reinforced material is greater than 30%) and is more advantageous compared with an aluminum phosphite system.

The flame retardant system of the present invention is suitable for use in a thin-walled product. With regard to flame retardance of a polymer material, since a contact area with the air can obviously affect a combustion performance of the material, a thinner product has a larger contact area with the air and thus the flame retardance is more difficult. Flame retardance instability under a thickness of 0.4 mm can occur in a synergistic system of the aluminum diethylphosphinate and the aluminum phosphite. However, since a synergist has a higher phosphorus content than the aluminum phosphite, the flame-retardant system of the present invention shows a better flame retardance and can realize a UL94 VO rating under a thickness of 0.4 mm.

When the glass fiber reinforced material is the glass fiber reinforced nylon or the glass fiber reinforced polyester, a mass proportion of the high-flame-retardant halogen-free flame-retardant compound system in the glass fiber reinforced material is 10%-30%, and a flame-retardant rating of the glass fiber reinforced material can reach UL94 V-0, 0.4 mm.

When the glass fiber reinforced material is the glass fiber reinforced POK, a mass proportion of the high-flame-retardant halogen-free flame-retardant compound system in the glass fiber reinforced material is 5%-20%, and a flame-retardant rating of the glass fiber reinforced material can reach UL94 V-0, 0.4 mm.

Nylon in the glass fiber reinforced nylon comprises at least one of aliphatic polyamide and semi-aromatic polyamide.

Polyester in the glass fiber reinforced polyester comprises at least one of PBT and PET.

Compared with the prior art, the present invention has main advantages as follows: the multi-component synergistic high-heat and high-shear-resistant high-flame-retardant halogen-free flame-retardant compound system based on the aluminum diethylphosphinate overcomes the defects of the existing flame-retardant system, can be used as a halogen-free flame-retardant system of the glass fiber reinforced engineering plastics, solves flame-retardant problems of a high content of glass fibers and a thin-walled product, and can be used for preparing a novel halogen-free flame-retardant glass fiber reinforced special material used in the electrical and electronic fields.

DESCRIPTION OF THE EMBODIMENTS

The following further describes the present invention in combination with specific examples. It should be understood that these examples are only used to illustrate the present invention, but not for the limitation of the scope of the present invention. Operation methods in the following examples which are not specified with specific conditions are generally performed according to conventional conditions or according to the conditions recommended by a manufacturer. Unless otherwise specified, the addition amount of materials refers to parts by weight.

Preparation of Mono-Phosphorous Acid-Aluminum Condensed Diphosphite

Mono-phosphorous acid-aluminum condensed diphosphite has a molecular structure shown in the following formula:

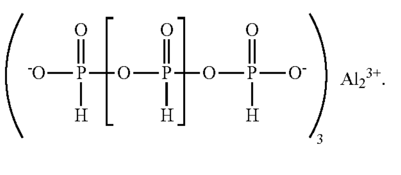

A preparation process comprises the following steps: 82 g (1 mol) of phosphorous acid, 540 g (2 mol) of aluminum hydrogen phosphite ($(H_2PO_3)_3Al$) and 12 g of concentrated phosphoric acid ($H_3PO_4$) with a concentration of 85.1 wt % are weighed and dissolved in 1,500 g of water, the materials are fully stirred and mixed uniformly, reaction is performed at 85° C. for 3 hours, and an obtained product is subjected to a rotary evaporation at −0.08 MPa and 85° C. until water is evaporated to 50 wt %. The material is transferred to an oven, heated to 130° C., and dried for 120 min until a moisture content of the solid is 0.2 wt %, the dried solid is placed in a high-temperature vacuum oven to be heated at 240° C. for 3 hours, the material is cooled to room temperature and discharged, the material is washed with water and separated, the water washing is finished until a conductivity of a washing effluent is less than 50 μs/cm, the material is dried at 130° C. until a water content of 0.08 wt %, the material is crushed to an average particle size D50 of 40 μm, wherein a yield is 97.8%, and related tests and use are performed.

Preparation of Aluminum Condensed Diphosphite

An aluminum hydrogen phosphite ($(H_2PO_3)_3Al$) solid is crushed to an average particle size D50 of 9.2 μm, 540 g of the crushed solid is uniformly mixed with 10.8 g of concentrated phosphoric acid ($H_3PO_4$) with a concentration of 85.1 wt %, the solid is placed in an oven, the solid is firstly heated to 130° C. at a heating speed of 3° C./min, the temperature is kept for 30 min, the solid is then heated to 180° C. at a heating speed of 2° C./min, the temperature is kept for 30 min, the solid is then heated to 240° C. at a heating speed of 1° C./min, the temperature is kept for 60 min, the solid is then heated to 290° C. at a heating speed of 2° C./min, the temperature is kept for 30 min, and the solid is cooled to normal temperature and crushed to a particle size D50 of 6.2 μm.

Example 1

A compound flame-retardant system was used in a glass fiber reinforced nylon. Performances of the flame retardant are investigated according to the following steps and test methods.

1) Compounding of Halogen-Free Flame Retardant System

Each component of the compound flame retardant system was added into a high-speed stirrer according to a proportion in Table 1 and stirred at a high speed for 10 min to complete mixing of the halogen-free flame retardant system. The material was discharged and detected for later use.

2) Extrusion Granulation of Material

A temperature of each zone of a twin-screw extruder was set at a preset temperature, after the temperature was stabilized for 20 min, a nylon system was added from a hopper, glass fibers were added through a glass fiber feeding port, the flame retardant system powder was added through a powder feeding port, and a host machine and a feeder were started to complete an extrusion granulation of the material. The granulated material was fed into a feed bin through an air conveying system and dried.

3) Use and Tests of Material

The dried material was subjected to an injection molding in an injection molding machine to form a standard sample specified by various test standards and performances of the related material were tested. The following performance indicators were mainly concerned:

1. Flame Retardance

A test was performed according to a UL94 standard test (thickness of test piece of 0.4 mm). The flame-retardant performance was graded according to UL94 as follows:

V-0: burning continued for less than or equal to 10 s each ignition, a total of 5 test samples were ignited, each test sample was ignited twice, a total continuous burning time of 10 times of ignition of the 5 sample strips was less than or equal to 50 s, there was no combustion drips, the test samples were not completely burnt out, and after the ignition was finished, there was no smoldering of the test samples for more than 30 s.

V-1: burning continued for less than or equal to 30 s each ignition, a total of 5 test samples were ignited, each test sample was ignited twice, a total continuous burning time of 10 times of ignition of the 5 sample strips was less than or equal to 250 s, there was no combustion drips, the test samples were not completely burnt out, and after the ignition was finished, there was no smoldering of the test samples for more than 60 s.

V-2: cotton was ignited by combustion drips, wherein the other standards were the same as V-1.

The test here only concerned whether V-0 was reached. If so, it was recorded as PASS. If not, it was recorded as FAIL.

The flame-retardant test was related to a thickness. A thickness of the thinnest test sample was investigated here and the thickness of the test sample was 0.4 mm.

2. Characterization of Shear Resistance of Flame Retardant

A shear resistance was characterized by indirectly testing a pH value of water after the granulated material particle was soaked in the water. A basic principle is as follows: in a twin-screw extruder, due to a high-speed rotation of a screw and pushing forward in a screw feed cylinder, the flame retardant can produce a friction with the glass fibers in parts of a device and a system, the flame retardant is easy to decompose after receiving a strong shear action and under an action of high temperature and strong shear, the phosphorus-containing flame retardant is decomposed to produce a chemical substance which is acidic under high temperature and shear, the substance can migrate out and is dissolved in water, such that the water for soaking the particle is acidic, and the acidity is compared by testing a pH value of water. Generally, when shear resistance is weaker, the water for soaking the particle is stronger in acidity. When the pH value is lower, the lower pH value will reduce a material performance and cause corrosion to a device. An objective of the present invention is that the pH value greater than 4 under a certain condition indicates that the flame retardant has a better high temperature and shear resistance.

A test process was as follows: 10 g of the particle was dispersed in 100 g of water, a temperature was kept constantly at 25° C. for 2 hours, the particle was filtered, and the pH value of the water was tested.

3. Characterization of Moisture Absorption of Flame Retardant 50 g of the mixed flame retardant sample was taken, weighed, and placed into a constant-temperature and constant-humidity box, a temperature was set at 85° C. and a relative humidity at 85%, and the sample was taken out after 48 h and weighed again. A weight gain was the absorbed moisture and a water absorption rate can be calculated. A moisture absorption rate of the flame-retardant system of the present invention was targeted to be <0.1%. At this time, the flame retardant had a relatively low moisture absorption rate.

Each material and a proportion thereof in the examples were shown in Table 1. Test results of the obtained material were shown in Table 1.

Example 2

An implementation process was the same as that in example 1. Except for that the flame retardant system contained three components, a total amount of the flame-retardant system was kept unchanged. Other materials and proportion thereof were shown in Table 1. Results of the obtained material were shown in Table 1.

Example 3

An implementation process was the same as that in example 1. Except for that the flame retardant system contained three components, a total amount of the flame-retardant system was kept unchanged. Other materials and proportion thereof were shown in Table 1. Results of the obtained material were shown in Table 1.

Example 4

An implementation process was the same as that in example 1. Except for that the flame retardant system contained four components, a total amount of the flame-retardant system was kept unchanged. Other materials and proportion thereof were shown in Table 1. Results of the obtained material were shown in Table 1.

Example 5

An implementation process was the same as that in example 1. Except for that mono-phosphorous acid-aluminum condensed diphosphite was replaced with aluminum condensed diphosphite, the rest was unchanged. Other materials and proportion thereof were shown in Table 1. Results of the obtained material were shown in Table 1.

Comparative Example 1

An implementation process was the same as that in example 1, except for that the flame-retardant system only used a single component of aluminum diethylphosphinate. Other materials and proportion thereof were shown in Table 1. Results of the obtained material were shown in Table 1.

Comparative Example 2

An implementation process was the same as that in example 1, except for that the flame-retardant system only used a compound system of aluminum diethylphosphinate and aluminum phosphite. Other materials and proportion thereof were shown in Table 1. Results of the obtained material were shown in Table 1.

Comparative Example 3

An implementation process was the same as that in example 1, except for that the flame-retardant system only used a compound system of aluminum diethylphosphinate and zinc stannate. Other materials and proportion thereof were shown in Table 1. Results of the obtained material were shown in Table 1.

TABLE 1

| Raw material compositions | | Example 1 | Example 2 | Example 3 | Example 4 | Example 5 | Comparative example 1 | Comparative example 2 | Comparative example 3 |
|---|---|---|---|---|---|---|---|---|---|
| Flame retardant system | Aluminum diethylphosphinate | 15 | 14.5 | 15 | 14.5 | 15 | 20 | 15 | 15 |
| | Mono-phosphorous acid-aluminum condensed diphosphite | 5 | 4.5 | 4 | 4.5 | — | — | — | — |
| | Aluminum condensed diphosphite | — | — | — | — | 5 | — | — | — |
| | Aluminum phosphite | — | — | 1 | 0.5 | — | — | 5 | — |
| | Zinc stannate | — | 1 | — | 0.5 | — | — | — | 5 |
| Power performances | Temperature at a weight loss of 2 wt % (° C.) | 432 | 434 | 420 | 425 | 424 | 422 | 380 | 428 |
| | Moisture absorption rate (%) | 0.06 | 0.06 | 0.09 | 0.07 | 0.09 | 0.05 | 0.16 | 0.05 |
| | PA66 | 40 | 40 | 40 | 40 | 40 | 40 | 40 | 40 |
| | Glass fiber | 40 | 40 | 40 | 40 | 40 | 40 | 40 | 40 |
| Material performances | Flame retardance (UL94-V0, 0.4 mm) | PASS | PASS | PASS | PASS | PASS | FAIL | PASS | FAIL |
| | pH value | 4.31 | 4.35 | 4.05 | 4.12 | 4.06 | 3.82 | 3.62 | 3.90 |

In addition, it should be understood that various changes and modifications may be made on the present invention by a person skilled in the art after reading the content of the present invention, and these equivalent forms also fall within the scope defined by the appended claims of the present application.

The invention claimed is:

1. A high-heat and high-shear-resistant high-flame-retardant halogen-free flame-retardant compound system, comprising the following components in weight percentages:

40%- 99.9% of aluminum diethylphosphinate, 0.1%- 50% of a poly/mono-phosphorous acid-condensed diphosphite salt, 0-40% of inorganic aluminum phosphite, and 0-10% of a zinc-containing thermally stable compound, wherein the poly/mono-phosphorous acid-condensed diphosphite salt has a structural formula shown in a formula (I):

(I)

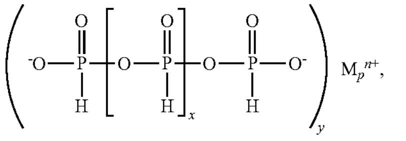

wherein, x is an integer of 1-6, n, y, and p are integers of 1-4, and M is Ca, Mg, Al, Zn, Fe, Sn or Ti.

2. The high-flame-retardant halogen-free flame-retardant compound system according to claim 1, wherein the aluminum diethylphosphinate has an average particle size D50 satisfying 10 μm<D50<50 μm.

3. The high-flame-retardant halogen-free flame-retardant compound system according to claim 1, wherein the poly/mono-phosphorous acid-condensed diphosphite salt has an average particle size D50 satisfying 10 μm<D50<50 μm.

4. The high-flame-retardant halogen-free flame-retardant compound system according to claim 1, wherein the inorganic aluminum phosphite has an average particle size D50 satisfying 10 μm<D50<50 μm.

5. The high-flame-retardant halogen-free flame-retardant compound system according to claim 1, wherein the zinc-containing thermally stable compound comprises at least one of zinc borate, zinc oxide, and zinc stannate, and has an average particle size D50 satisfying 10 μm<D50<50 μm.

6. A method of making a glass fiber reinforced material comprising the step of adding the high-flame-retardant halogen-free flame-retardant compound system according to claim 1 to a glass fiber reinforced nylon, a glass fiber reinforced polyester or a glass fiber reinforced POK.

7. The method according to claim 6, wherein a mass proportion of a glass fiber in the glass fiber reinforced material is more than 30%.

8. The method according to claim 6, wherein the glass fiber reinforced material is the glass fiber reinforced nylon or the glass fiber reinforced polyester, a mass proportion of the high-flame-retardant halogen-free flame-retardant compound system in the glass fiber reinforced material is 10%-30%, and a flame-retardant rating of the glass fiber reinforced material reaches UL94 V-0, 0.4 mm.

9. The method according to claim 6, wherein the glass fiber reinforced material is the glass fiber reinforced POK, a mass proportion of the high-flame-retardant halogen-free flame-retardant compound system in the glass fiber reinforced material is 5%- 20%, and a flame-retardant rating of the glass fiber reinforced material reaches UL94 V-0, 0.4 mm.

10. The method according to claim 6, wherein nylon in the glass fiber reinforced nylon comprises at least one of aliphatic polyamide and semi-aromatic polyamide; and polyester in the glass fiber reinforced polyester comprises at least one of PBT and PET.

11. The method according to claim 7, wherein the glass fiber reinforced material is the glass fiber reinforced nylon or the glass fiber reinforced polyester, a mass proportion of the high-flame-retardant halogen-free flame-retardant compound system in the glass fiber reinforced material is 10%-30%, and a flame-retardant rating of the glass fiber reinforced material reaches UL94 V-0, 0.4 mm.

12. The method according to claim 7, wherein the glass fiber reinforced material is the glass fiber reinforced POK, a mass proportion of the high-flame-retardant halogen-free flame-retardant compound system in the glass fiber reinforced material is 5%- 20%, and a flame-retardant rating of the glass fiber reinforced material reaches UL94 V-0, 0.4 mm.

13. The method according to claim 7, wherein nylon in the glass fiber reinforced nylon comprises at least one of aliphatic polyamide and semi-aromatic polyamide; and polyester in the glass fiber reinforced polyester comprises at least one of PBT and PET.

* * * * *